United States Patent [19]

DaVitoria-Lobo

[11] 4,149,340

[45] Apr. 17, 1979

[54] HYDROPONICS UNIT AND SYSTEM WITH AUTOMATIC GAS FED FEEDING

[76] Inventor: Luis J. DaVitoria-Lobo, 22 Lester St., St. John's, Newfoundland, Canada, A1E 2P7

[21] Appl. No.: 693,723

[22] Filed: Jun. 7, 1976

[51] Int. Cl.² ............................................. A01G 27/00
[52] U.S. Cl. .......................................................... 47/79
[58] Field of Search ................... 47/79, 80, 82, 59, 60, 47/62, 63, 64, 81

[56] References Cited

U.S. PATENT DOCUMENTS

| | | | |
|---|---|---|---|
| 2,249,197 | 7/1941 | Brundin | 47/79 X |
| 2,278,991 | 4/1942 | Hasslacher et al. | 47/79 X |
| 2,648,164 | 8/1953 | Bruch | 47/79 |
| 2,870,574 | 1/1959 | Sheridan | 47/79 X |
| 2,938,495 | 5/1960 | Hinton | 47/79 X |
| 2,983,076 | 5/1961 | Merrill | 47/79 X |
| 3,451,162 | 6/1969 | Rasmussen | 47/79 X |

FOREIGN PATENT DOCUMENTS

| | | | |
|---|---|---|---|
| 1296711 | 5/1962 | France | 47/79 |
| 1423079 | 11/1965 | France | 47/79 |
| 344762 | 11/1936 | Italy | 47/79 |
| 560904 | 4/1957 | Italy | 47/79 |
| 1145675 | 3/1969 | United Kingdom | 47/79 |

Primary Examiner—E. H. Eickholt

[57] ABSTRACT

Gas-fed feeding techniques which may be automated are disclosed for bottom fed - bottom drained growing systems. The feeding is done by displacing the nutrient by moving a surface by inflation or by introducing pressurized gas into a space that was formerly occupied by the nutrient. A means of passively and/or actively segregating the components of the growing medium by dividers, with regard to function and/or reuse, is also disclosed. A means of permitting light, to enhance the germination and/or growth of certain seed or plants, is also disclosed. A means of draining off, or adding nutrient to the unit without disturbing the plant, is also disclosed. A means of attaching artificial lights or plant growing aids to the unit is also disclosed. A means of providing additional plant support via the roots is also disclosed.

The automation of feeding by control of inflation by means of time, humidity, pressure and/or height of nutrient in the unit is also disclosed. The flexible use of modules for germination, growth and feeding is also disclosed. The proper use of one or more of these inventions may lead to flexibility and better use of space and equipment.

19 Claims, 8 Drawing Figures

HYDROPONICS UNIT AND SYSTEM WITH AUTOMATIC GAS FED FEEDING

This invention relates to the areas of hydroponics and automatic nutrient feeding, and in particular, to devices which may be automatically gas-fed, and to improved media for growth and germination of some seed.

Previously developed hydroponic devices with automatic feeding have used techniques of top feeding the nutrient solution and bottom draining, or bottom feeding and draining. These techniques make it difficult to simultaneously feed units placed at different heights above ground. The growing medium is usually light porous material, like expanded mica, to hold water, or heavier granular opaque non-porous siliceous material to hold the plant, or a mixture of the two. Mixes of the porous and the heavier material provide the combination of moisture to the roots and support to the plant. However, on repeated feeding, the lighter porous material tends to rise to the top, and this results in the exact opposite of the optimum functional arrangements; the plant needs support at the top of the growing medium and moisture below. The resulting segregation may lead to damping off, or loss of stance, and may need more frequent feeding. Also the inefficient use of materials with respect to their functions, has an undesirable effect on at least the weight of the unit. Certain algae and such life tend to grow in the nutrient which are difficult to remove without disturbing the growing plant. Some types of seed need light to germinate and the use of opaque materials in the growing medium, that reduce the light reaching the seed, reduces the success of germination in these seed.

Therefore it is an object of the subject invention to introduce pressurised gas as a means of nutrient feeding to allow positioning of growing units at different levels and feeding from a single pump, to improve the positioning and use of material in most growing media with regard to function, to provide a means of accessing and servicing some of the components of the unit, to improve the germination and growth, and/or to optimize the use of equipment.

By introducing pressurised gas into a space that is occupied by the nutrient solution, so as to displace the solution into the upper regions of a container, where the growing medium is contained, I have allowed the feeding of nutrient. Two general principles are employed. The first technique involves the separation of gas and nutrient by the natural forces (surface tension, gravity) that tend to segregate them. However, this technique introduces problems arising from the gas-nutrient interface, with splash-back and moist gas, which may be deleterious to the pressurised gas source and cause unnecessary evaporation, increasing the surrounding humidity, and increasing the necessary frequency of water replenishment in the nutrient. These problems may be serious in the long term. However, the second technique tends to minimise the gas-nutrient interface problems.

By inflating a container whose expansion displaces the nutrient solution into the growing medium I have isolated the nutrient from the gas, and reduced the problem associated with the gas-nutrient interface. Deflation returns the solution to its prior abode. A means of allowing the inflating fluid to flow essentially in one direction, into the inflatable container, further reduces such problems. If the top portion of the inflatable container is flexible, the collapse of this surface during deflation further reduces such problems, partially protecting the system against accidental rupture of the inflatable container.

I have improved the functional arrangement of the components of the growing medium and the nutrient solution by separating them by dividers which allow the solution to cross them but prevent some or all of the solid material from doing so. However, the finer roots and other growing parts, and some finer material may cross them and extend from one region to another. This technique may be used to maintain the bulk of the heavier (plant supporting) medium above the porous light (nutrient retaining) material for effective functional distribution of the components of the growing medium. This technique may also be used with proper reinforcement and support to maintain the growing medium above the resting nutrient, providing effective drainage in the process, and often eliminating the need for a special drainage medium and zone. For many plants, the layer of the growing medium which mainly supports the plant and maintains its stance is not very deep, and consequently this invention permits the use of relatively little heavy plant supporting medium, and reduces the dead weight of the unit. Often it also eliminates the need for the drainage zone, reducing the total height of the unit, and reducing the pressure requirements of the inflating system. The use of one or more fine screens in the growing medium maybe used to give the plant additional underground support by holding the plant root system.

The immediately preceeding invention is suitable for plants with fibrous roots. If, however, the plant has bulbous roots, or bulbous underground stems, the growth of the bulb may be difficult without injury to the divider that separates the heavy and porous material, or the bulb or both. A compromise is reached by using heavy medium with small size and light porous material with larger size. Mixing is permitted, and a system of dividers may be introduced which allows the separation of the two media during feeding, so that they may be reused.

By attaching and/or properly supporting a suitably reinforced divider that is located below the growing medium (which may or may not include the drainage medium if there is one) by a means which is detachable from the resting nutrient solution container, I have facilitated the access to, cleaning and servicing of some of the components of the unit, without substantially distrubing disturbing plant and growing medium. Similar dividers allow other components to be similarly accessed and serviced.

Some types of seed need some portion of the light spectrum to germinate. I have, for use with these seed, replaced the opaque heavier material with transparent or translucent, coloured or colourless material, to improve their germination.

Also it is sometimes desirable to drain off the nutrient fluid. I have facilitated this by providing a siphon, or drainage means at the bottom of the unit.

Provision for artificial lighting is also made by means of holders attached to the unit in which rods may be held upright. The lighting fixtures may be attached to these by some movable means. These rods may also be used to secure devices that guide the plants' growth.

Another feature of the invention is the use of modular units, which provide flexibility in germination and growth. Seeds may be germinated in small sub-units under the proper conditions, and these sub-units may be subsequently incorporated very simply into larger units without transplanting. Also the larger units may be easily added to, or removed from the feeding unit. This permits flexibility and continuity for optimum use of the equipment.

In drawings which illustrate embodiments of the present invention,

Figure 1:
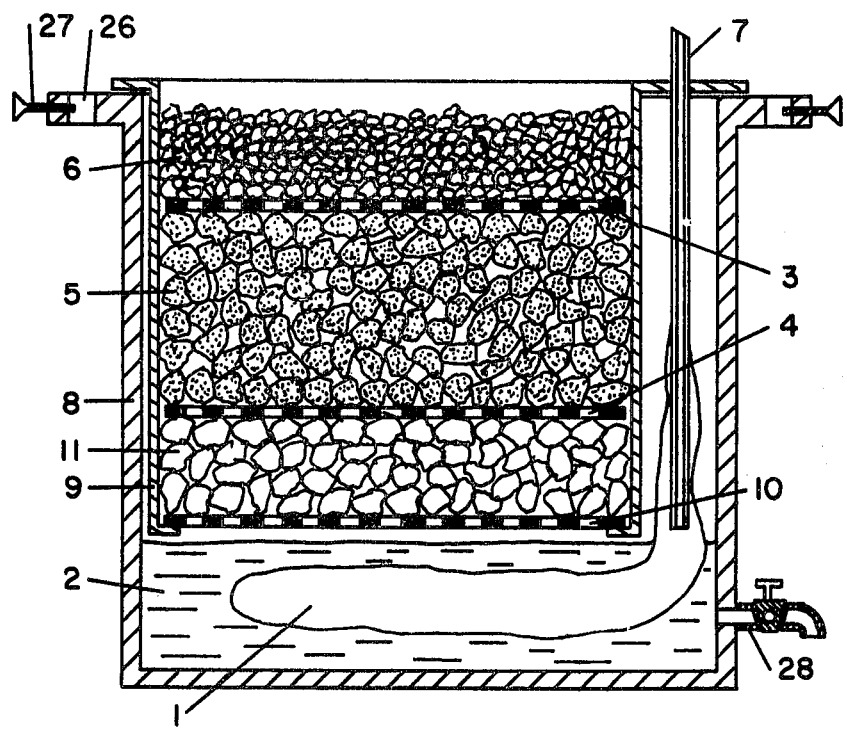
FIG. 1 is a sectional view of a simple unit with some of the features of the present invention.

In FIG. 1 a bag 1 which is inflatable, by pumping air or some suitable gaseous fluid through the tube 7, by human means or by a suitably controlled pressurized gas supply or by a suitably controlled pump or by some such means, displaces the nutrient solution 2 pushing the solution into the upper regions of the container 8. Bag 1 may be perforated above the level of the nutrient, to allow the inflation to subside after feeding or watering is completed, or Bag 1 may be imperforated and air tight, and deflation is allowed to proceed by exposing the entrance to tube 7 to atmospheric pressure. Item 3 is a perforated sheet or gauze with perforations of such size that fibrous roots, fine growing medium material and nutrient solution may cross it. However, the bulk of heavy light permitting material 6, and the bulk of light porous material 5, are prevented from crossing this region 3 and mixing with each other. In this figure, material 6 is not opaque to light. Because material 6 is of higher density than material 5, if this divider 3 were not present, repeated feeding and disturbance would tend to make material 6 move down and material 5 would move upward, upsetting the functional arrangement: the heavier granular material 6 provides support for the plant and prevents water-logging, while the porous light material 5 retains moisture from the feeding and gives it to the roots of the plant as they may need it. Divider 4 similarly separates materials 5 and 11. Material 11 may be even lighter than material 5, and is mainly used to provide drainage. Divider 10 separates Material 11 from the nutrient 2, and also provides support for the growing medium 5 and 6 and drainage medium 11. A container 9 which is open at the bottom and top provides a means of transferring the weight of the growing medium to the container 8, and allows the movement of nutrient 2. Item 26 will accept a rod to which a lighting fixture and/or other accessories are attached. The rod may be secured by tightening screw 27. The way in which the lighting fixture or accessory is attached to the rod is such that it can be moved up and down the rod, and/or secured. There may be more than one of the items 26 and 27 depending on design. Tap 28 allows drainage of the nutrient from the container 8 without disturbing the growing medium.

Figure 2:
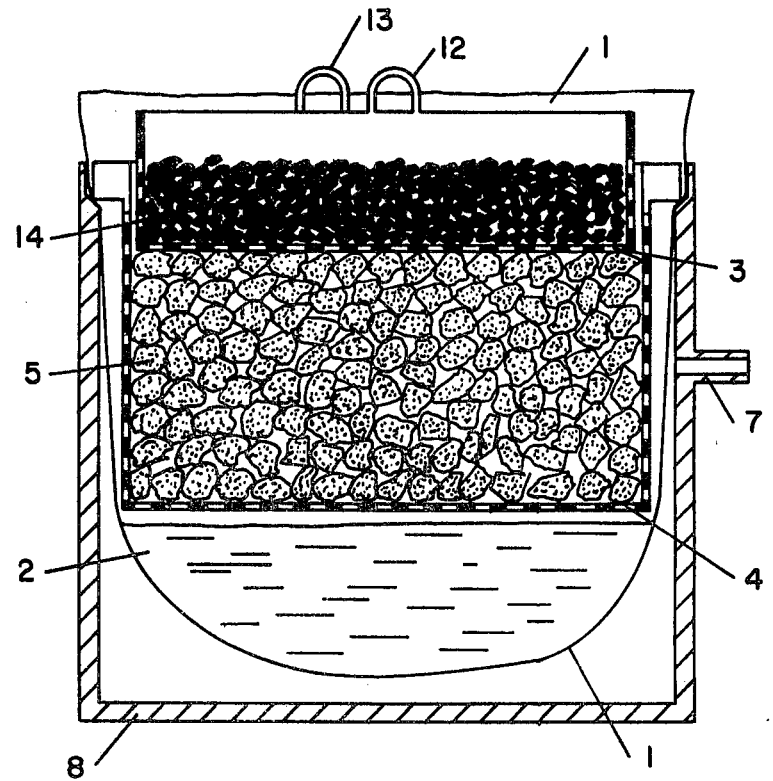
FIG. 2 is a sectional view of another embodiment with some of the features of the present invention.

In FIG. 2, membrane 1 displaces the nutrient 2 when an inflating fluid is introduced through inlet 7 between membrane 1 and the inner walls of the container 2. Container 3 is perforated and contains opaque heavy material 14, that replaces material 6 in FIG. 1. Handles 12 are attached to container 3 to facilitate removal and replacement of this component of the unit. Container 4 replaces divider 10 and container 9 in FIG. 1. There is no drainage medium, since material 5 which is light and porous performs this function along with the function of retaining moisture. Handles 13 are attached to container 4 to facilitate handling of this component. The pressure of container 4 against container 8 via the membrane 1 at the lip of container 8 effectively seals the space between membrane 1 and container 8, or the contours of the lips of containers 4 and/or 8 may be such as to allow some leakage for deflation. Containers 3 and/or 4 may be rigid or flexible.

Figure 3:
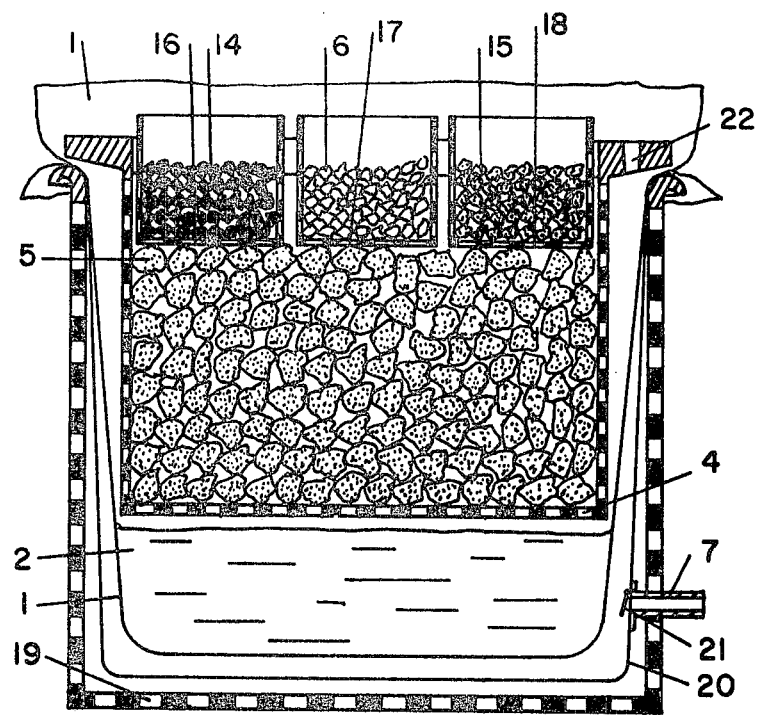
FIG. 3 is a sectional view of still another embodiment showing some of the features of the present invention.

In FIG. 3, nutrient 2 is displaced by inflating the space between membranes 1 and 20, via the inlet 7 which has a one-way valve attached to it. This valve 21 or similar device allows the rate of flow into the space between membrance 1 and 20 to be greater than the rate of flow from this space back through inlet 7. In case membrane 1 is accidentally ruptured, the collapse of membrane 1 against the opening of inlet 7 tends to prevent leakage of the nutrient fluid. In addition, device 21 further protects against unwanted nutrient leakage, until the rupture is fixed or membrane replaced. Membranes 1 and/or 20 may be self reinforced to withstand the weight of nutrient and the pressure of inflation. Membrane 20 is externally reinforced by a perforated vessel 19. Vessel 19 may be perforated to allow easy access of inlet 7 to membrane 20, and/or to reduce the weight of the unit, and/or sometimes to provide flexibility of the shape of the unit. Container 4 is similar to, and performs essentially the same functions as container 4 in FIG. 2. However, there is an opening 22 at the top of container 4, which permits the addition of nutrient or water into the unit, and also allows the introduction of a tube into the nutrient space to siphon out the nutrient. One part of the invention shown here is the use of germination modules 16, 17 and 18. Module 16 contains opaque material 14, module 17 contains colourless non-opaque material 6, and module 18 contains suitably coloured non-opaque material 15. Three modules are depicted here, but this does not necessarily limit the number of modules used, or their contents. These modules may be rigid, or flexible by using netting for their construction. These germination modules allow the seed to be germinated separately, under suitable conditions and germination medium, and transferred to the unit in the same module without substantially disturbing the new plant. Conventional transplanting is not necessary.

Figure 4:
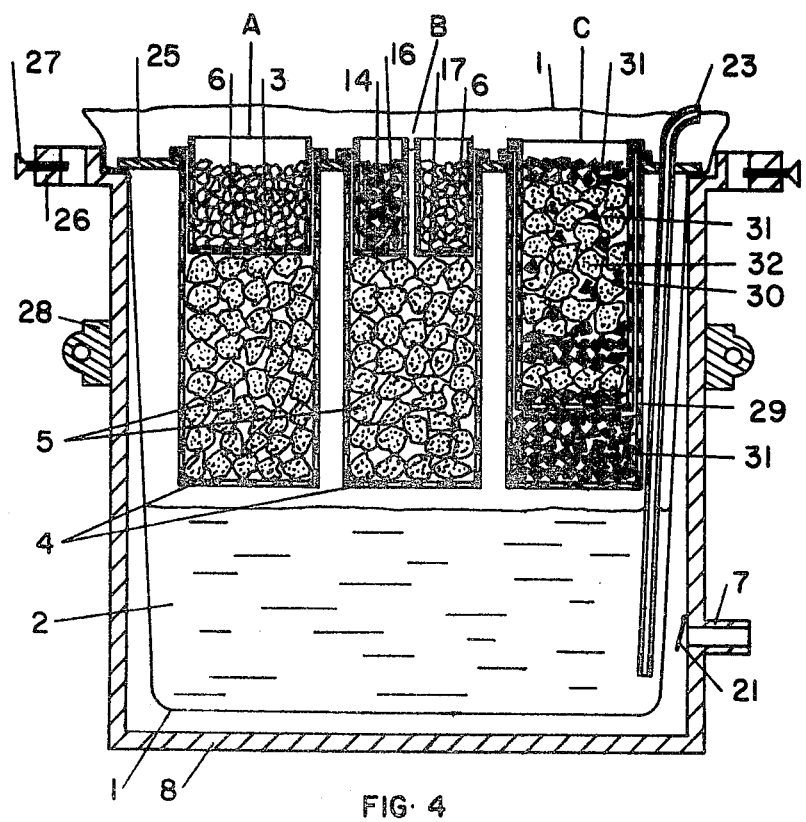
FIG. 4 is a sectional view of an embodiment of one system of modular sub-units that does not exclude other arrangements.

In FIG. 4, the inflating fluid inlet 7 has a spring loaded valve which stays shut when no pressure is used. During inflation, the pressure differential across the valve maintains it open. Components 28 are used to attach handles to container 8, which is used as a feeding tank for three growing units A, B and C.

Though this configuration was chosen for FIG. 4, it by no means implies that other configurations are not possible or included. These units may be removed, replaced and rearranged as desired. Units A and B are similar to units previously discussed. Unit C is specially adapted to growing plants with bulbous roots or underground bulbous stems. However, Unit C may also be used to grow plants with other underground parts. Unit C has an outer perforated container 29 which allows the nutrient to move in and out, but does not permit the heavier growing medium 31 to escape, by virtue of the size of its perforations. Container 30 is also perforated, but its perforation is such as to allow medium 31 to escape, but does not allow the lighter porous medium 32 to escape. Medium 31 is of finer size than medium 32. Container 30 is deep enough to contain the majority of the root and/or stem. This configuration or similar devices are operated as follows: The medium 32 is first made to fill the majority of the container 30. On top of this material 32 is placed material 31. As repeated feeding is done, the heavier material 31 tends to move to the bottom. It is then automatically dynamically separated from material 32 by the screening action of container 30, and collects in container 29. This screened material 31 may be reused to add to the top layer of 31. This unit allows material in the growing medium to perform its function, be reused, and has no part that may seriously injure the underground part of the plant, or itself be injured. The units A, B and C are supported on a support 25. A siphon 23 allows the nutrient to be drained. Other numbered items in this figure perform similar functions to items of the same numbers in FIGS. 1, 2 and 3.

Figure 5:
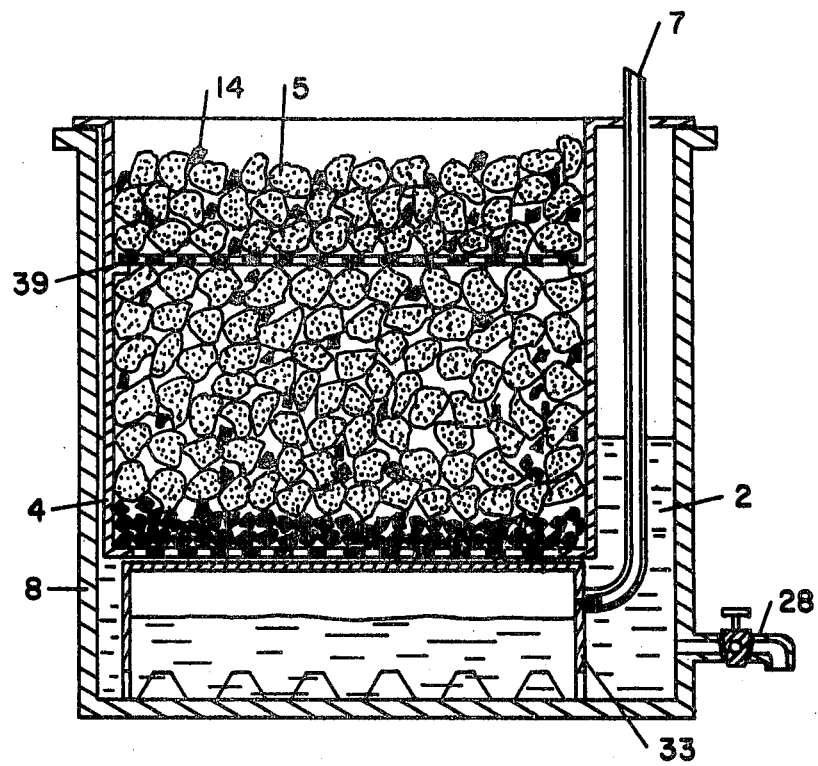
FIG. 5 is a sectional view of another simple unit showing another means by which gas pumping may be used for nutrient feeding.

In FIG. 5, a means of displacing the nutrient solution 2 by pumping gas into a space previously occupied by the nutrient solutions, is shown. The gas is pumped through tube 7 into the space in container 33. Container 33 has an open bottom and a closed top. The pressurised gas is trapped at the top of this container and displaces the nutrient solution 2 out under the container 33 into the growing medium which is a mixture of heavier material 14 and light water holding material 5. The segregation of material 14 to the bottom is shown. Also shown in a screen 39 whose main function here is to tangle with the plants' rooting system and give the plant additional underground support. The screen may or may not have a rigid border. One screen is shown but this does not exclude the use of multiple screens. These screens may be used to perform the dual function of divider and underground support. Other numbered items perform essentially the same functions as items with the same numbers in previous figures.

Figure 6:
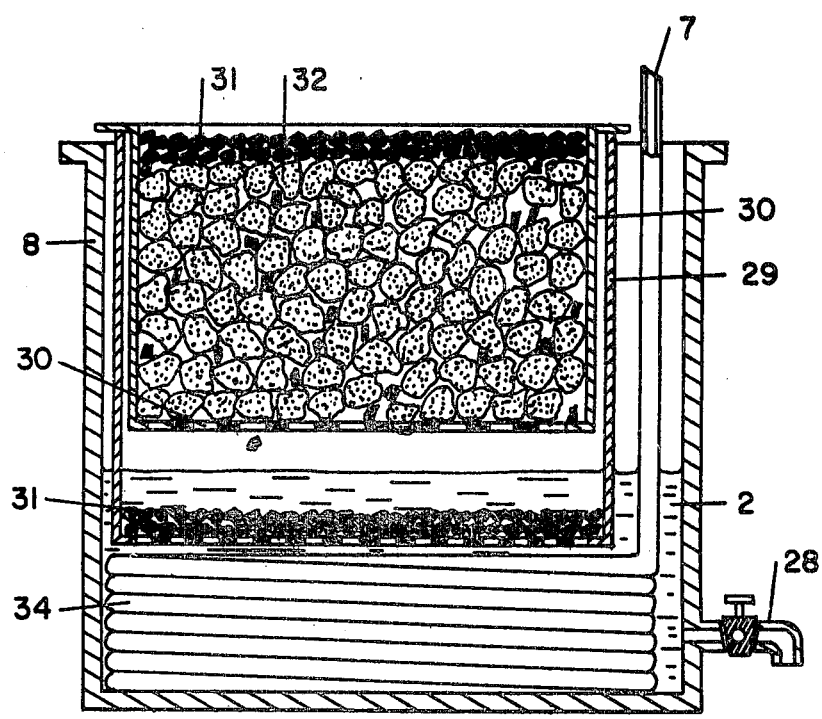
FIG. 6 is a sectional view of another embodiment showing some of the features of the present invention.

In FIG. 6, tube 7 enters the unit and is coiled at the bottom of container 8 in region 34. The tube is open at both ends, but is essentially intact at other points. The end near 7 is connected to a pressurised gas supply or a pump. When the pressurised gas is allowed into the tube, it pushes nutrient solution out of the lower regions of the tube through the submerged open end of the tube into the growing medium. The coiled tube 34 may or may not be used to support container 29. In this figure, a unit, which may be used to grow plants with fibrous roots and/or bulbous underground parts, is shown. Its operation is similar to that of Unit C in FIG. 4. Other numbered items perform essentially the same function as items with the same numbers in previous figures.

Figure 7:
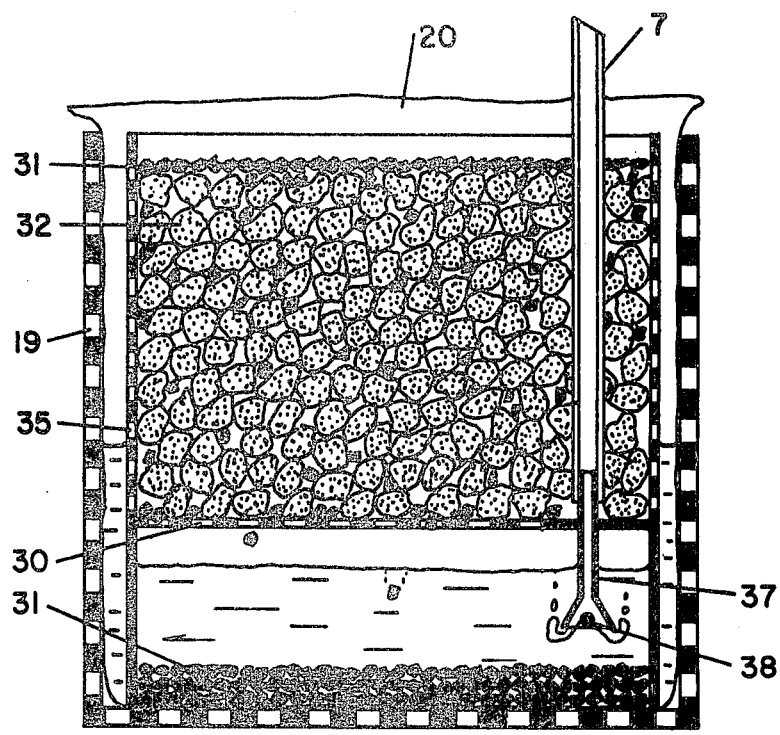
FIG. 7 is a sectional view of still another embodiment of the present invention showing some features.

In FIG 7 the outer container 19 is perforated to reduce weight, and is lined with a sheet 20. Container 35 performs a dual function. It holds the growing medium 31 and 32, and allows the dynamic separation of material 31. However it also traps the pressurised gas below it pushing the nutrient solution under and out into the growing medium. Though these functions are performed by one component here, it does not imply that they may not be performed by separate components. Just before nutrient feeding, the growing medium is usually only partly wet. This moist medium effectively seals the pressurised gas cavity, if the medium and divider perforations are properly sized. During feeding the gas pressure is raised and this seal breaks under higher pressures. The trapped pressurised gas bubbles through the soaked medium and allows the nutrient solution 2 to drain back into the lower regions of the unit. Device 37 allows the pressurised gas to enter the unit, but reduces fluid flow out, which might consist of a hollow sealed ball 38 in a cone. During pressurisation the ball is pushed away from the inlet allowing the gas to flow in. However, when feeding is completed, the ball is pushed back by the fluid to effectively seal the inlet and reduce splash-back. Other numbered items perform essentially similar functions to items of the same numbers in previous figures.

Figure 8:
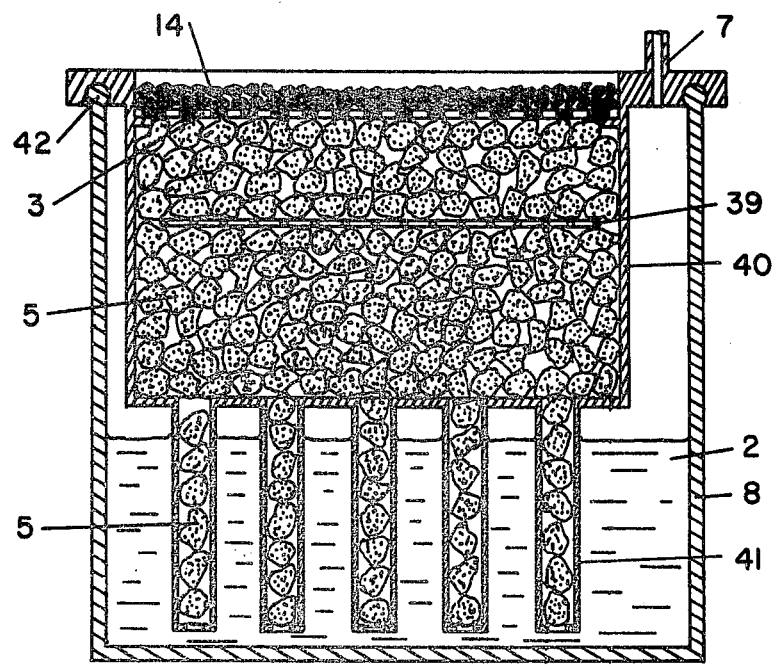
FIG. 8 is a sectional view of another embodiment of the present invention showing some features.

In FIG. 8 the pressurised gas is introduced through inlet 7 which forces the nutrient 2 through the tubes 41 into the growing medium. The tubes 41 may be an integral part of container 40 which contains the growing medium, and the tubes may be of large enough diameter to allow some of the growing medium to descend into the nutrient. This allows capillary action to raise the nutrient into the growing medium, providing moisture to the roots, between feedings. Device 42 may be a seal which essentially allows the space between the containers above the nutrient, to be pressurised. It may be of the snap-in type. Screen 39 is employed mainly for plant support via the roots. Divider 3 may be supported by container 40 as shown in this Figure, rather than on the porous medium 5. This reduces the compressive forces on medium 5, which may tend to lose porosity under compression. Other numbered items perform essentially the same functions as items with the same numbers in previous Figures.

Automatic control of the feeding process may be achieved by controlling the inflation and/or deflation. The inflating fluid may be delivered from a pressurised store and/or from a pump. The controlling means may be activated by time, humidity or pressure in the inflated region and/or height of fluid on the unit. The inflation may also be humanly controlled, or humanly done.

The hydroponic devices to which this invention relates encompasses a wide range of possible sizes. This invention applies to small units and to large scale applications. Large scale applications include but are not limited to automated lawn feeding, playground feeding etc., besides the usual applications of vegetable, fruit and flower cultivation.

Thus this invention encompasses a wide range of possible devices, arrangements, materials and means, and includes, but is not limited to the specific descriptions employed here to describe the invention.

In the claims, "nutrient liquid" means an aqueous solution and/or suspension of nutrient substances required by the plant.

I claim:

1. A hydroponic assembly comprising an outer container adapted to receive and hold a nutrient liquid and at least one structure adapted to be located within said outer contaner so as to form at least one inner container adapted to hold a particulate plant growing medium and adapted to support at least the bulk of said medium a substantial distance above the bottom of said outer container when located therewithin and means for controlling the level of nutrient liquid within said assembly when disposed therewithin, said means comprising a chamber that is adapted to be disposed within said outer container, so as to occupy the bulk of the space between the bottom of said outer container and the lower portion of said inner container, the upper surface and the bulk of the side surfaces of said chamber being closed, the interior of said chamber being in fluid communication with the interior of said outer container, and a conduit for the introduction of pressurised gas leading from the exterior of said outer container to the interior of said chamber.

2. The invention defined in claim 1 further including means operatively associated with said chamber for allowing said pressurized gas to escape from said chamber.

3. The invention defined in claim 2 wherein said outer container is open-topped and said inner container is adapted to hold particulate growing medium and has a perforated bottom surface, a perforated divider being disposed within said inner container, said divider separating a layer of relatively dense, plant supporting medium within said growing medium from a layer of relatively light, nutrient retaining medium within said growing medium.

4. The invention defined in claim 3 wherein said plant supporting medium is disposed above said divider which in turn is disposed above said nutrient retaining medium.

5. The invention defined in claim 3 further including at least one sheet of finely perforated material disposed within said growing medium and adapted to provide support for the roots of a plant placed therein.

6. The invention defind in claim 3 wherein the relatively dense plant supporting medium is relatively fine-textured, the relatively light nutrient retaining medium is relatively coarse textured, and wherein the perforations of said divider are of such a size as to allow said plant supporting medium to pass therethrough but to prevent passage of the bulk of said nutrient retaining medium, and wherein said divider is adapted to be supported within said inner container at a substantial distance above the bottom of said inner container.

7. The invention defined in claim 1 wherein said chamber comprises a coiled tube disposed adjacent the bottom surface of said outer container, the lower end of said tube being open and the upper end of said tube being joined to said conduit by means of a fluid-tight connection.

8. The invention defined in claim 1 wherein said inner container when located within said outer container, is adapted to support a part of said particulate medium close to the bottom of said outer container so that said part of said medium is submerged within said nutrient liquid, when disposed within said assembly, so as to provide capillary transport of said nutrient into said medium.

9. The invention defined in claim 8 further including means operatively associated with said chamber for allowing said pressurized gas to escape from said chamber.

10. The invention defined in claim 9 wherein said outer container is open-topped and said inner container is adapted to hold particulate growing medium a perforated divider being disposed within said inner container, said divider separating a layer of relatively dense, plant supporting medium within said growing medium from a layer of relatively light, nutrient retaining medium within said growing medium.

11. The invention defined in claim 10 wherein said plant supporting medium is disposed above said divider which in turn is disposed above said nutrient retaining medium.

12. The invention defined in claim 10 further including at least one sheet of finely perforated material disposed within said growing medium and adapted to provide support for the roots of a plant placed therein.

13. The invention defined in claim 1 wherein said inner container is attached to said chamber.

14. The invention defined in claim 8 wherein said inner container is attached to said chamber.

15. The invention defined in claim 8 wherein the bulk of said structure that is adapted to form said inner container is perforated.

16. The invention defined in claim 8 wherein the walls of said outer container and said chamber are fabricated as one piece, and a bottom structure is so attached to said walls of said outer container, by means of a water-tight seal, as to permit said walls and bottom structure together to contain said nutrient liquid.

17. The invention defined in claim 16 wherein the inner surface of said walls of said outer container are defined as the walls of said inner container and the upper and side surfaces of said chamber are defined as the lower portion of said inner container.

18. The invention defined to claim 1 wherein the bulk of said structure that is adapted to form said inner container is perforated.

19. The invention defined in claim 15 wherein the bulk of said structure adapted to form said inner container is composed of flexible material.

* * * * *